United States Patent [19]

Lucas

[11] 4,328,916

[45] May 11, 1982

[54] FISH RINGER

[76] Inventor: Donald K. Lucas, 7849 Delisle Fourman Rd., Arcanum, Ohio 45304

[21] Appl. No.: 121,398

[22] Filed: Feb. 14, 1980

[51] Int. Cl.$^3$ ............................................. A01K 65/00
[52] U.S. Cl. .................................................. 224/103
[58] Field of Search ................ 224/103; 43/4, 54.5 R, 43/54.5 A, 27.4; D22/22, 31

[56] References Cited

U.S. PATENT DOCUMENTS

| | | | |
|---|---|---|---|
| 1,407,221 | 2/1922 | Reimers | 224/103 |
| 2,426,298 | 8/1947 | Davy | 224/103 |
| 2,698,117 | 12/1954 | Graves | 224/103 |
| 2,794,582 | 6/1957 | Baldridge | 224/103 |
| 2,852,173 | 9/1958 | Milner, Sr. | 224/103 |
| 2,972,438 | 2/1961 | Kimbrough | 224/103 |

*Primary Examiner*—Stephen Marcus

[57] ABSTRACT

A fishing tackle accessory for fisherman to keep fish alive in the water includes a plastic circular ring having peripherally spaced-apart pins, each with a snap hook swiveled thereto to hold the fish attached thereto. The ring includes a diametrically extending bar or handle, having a central opening. The snap hooks are movable at the free loop ends thereof into substantial alignment with the central opening such that a rope can pass through the loop ends of the snap hooks collectively holding the snap hooks together and in compact flat positioning when carrying the fish ringer. A snap clip on one end of the rope permits securing thereof to the wrist of an individual using the same or securing thereof to a post, eyelet or loop end of a bolt fastening member of a landing dock, fishing pier or boat. A downwardly extending recess is provided under the diametrically extending bar or handle for weight reduction; the plastic circular ring also is complemented by an L-shaped ring which snap-fits into a groove or undercut of the circular ring to form an annular space or chamber filled with a buoyant foam material confined therein for making a floating version of the fish stringer.

17 Claims, 8 Drawing Figures

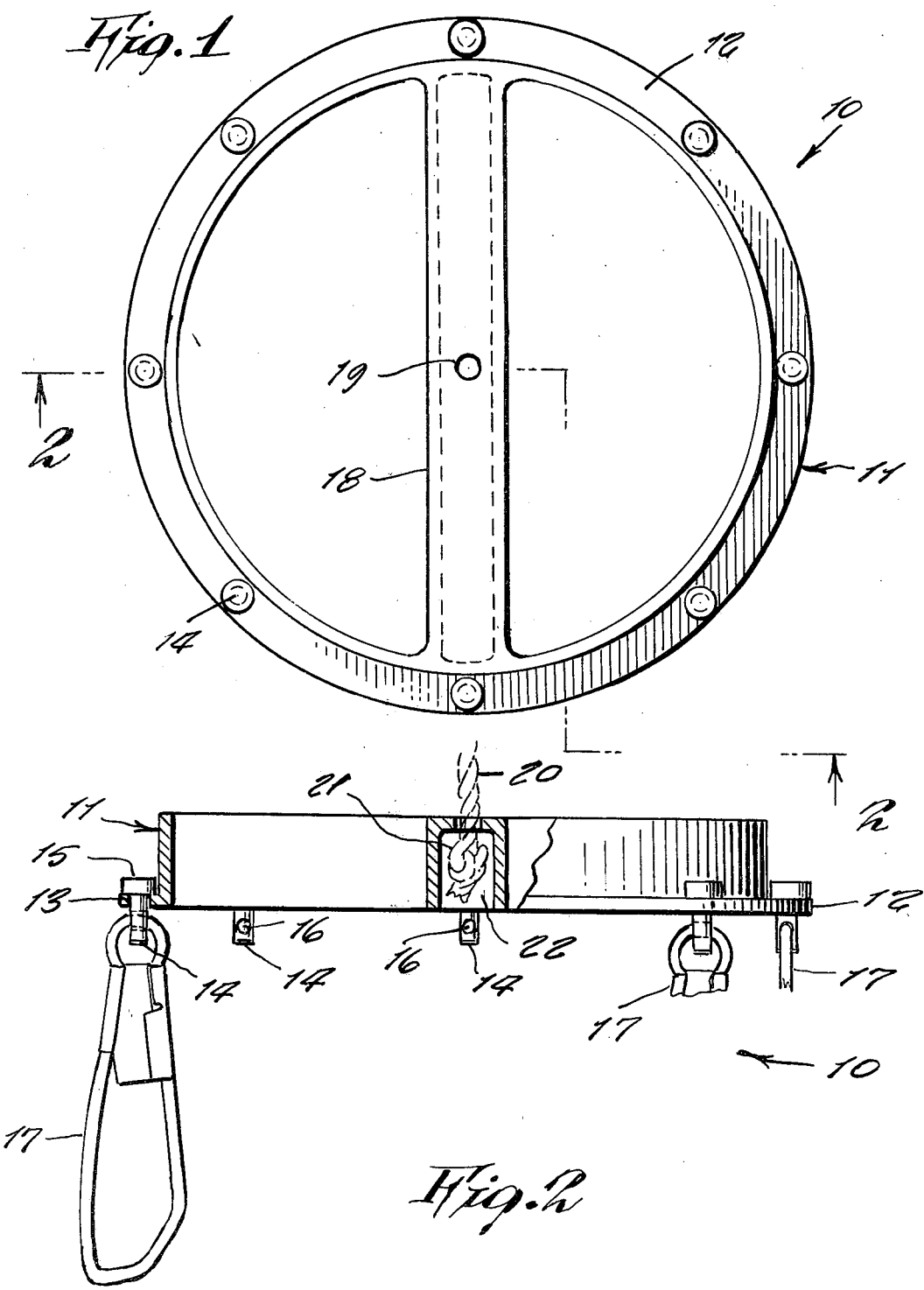

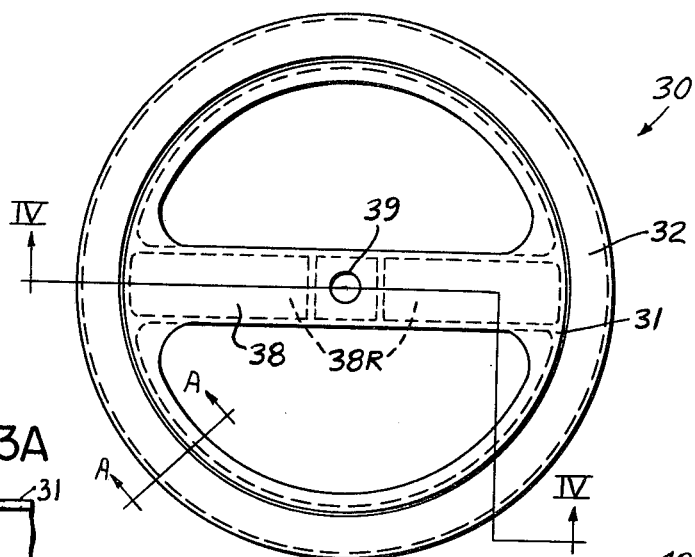
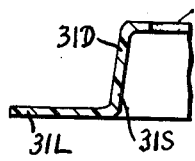
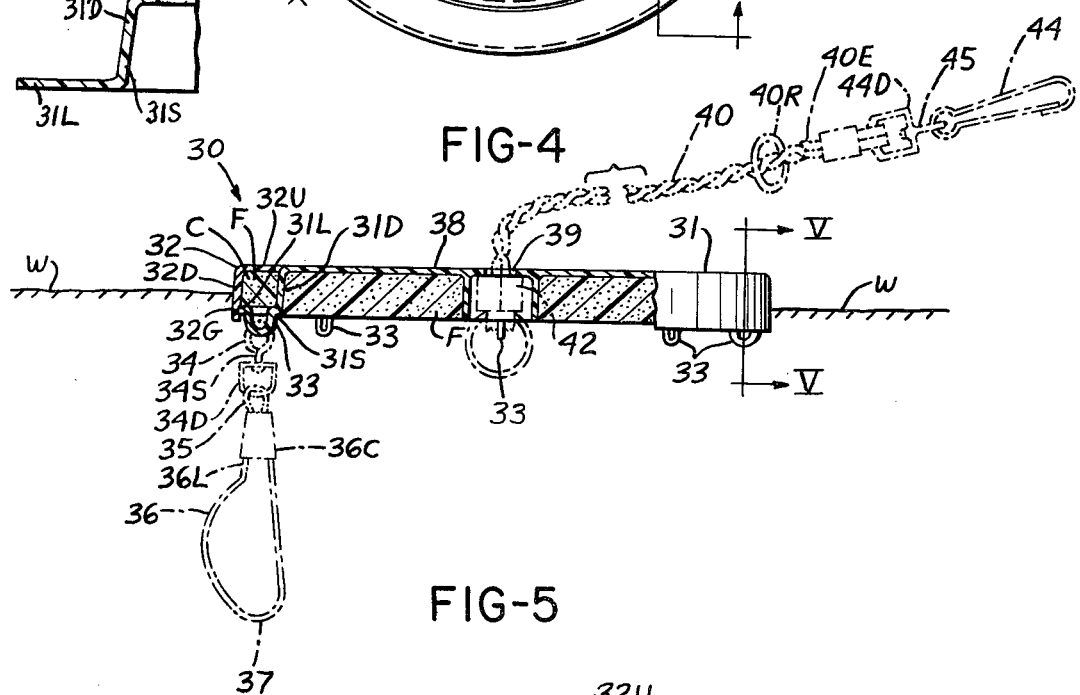
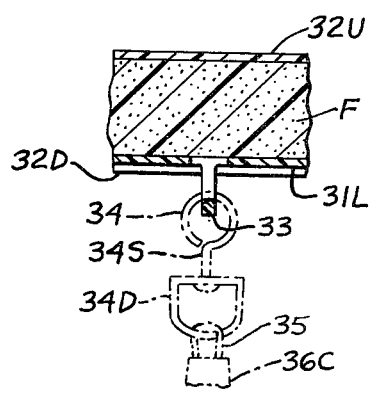

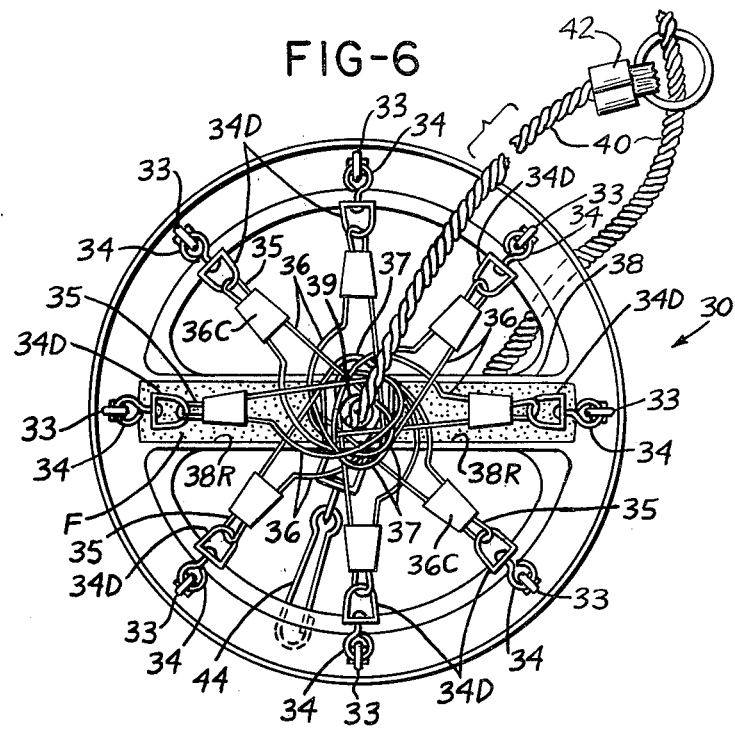
FIG-6
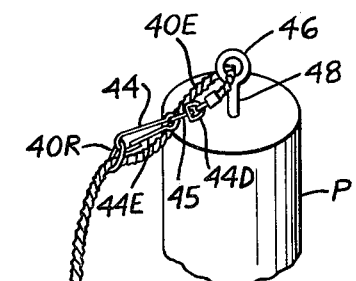
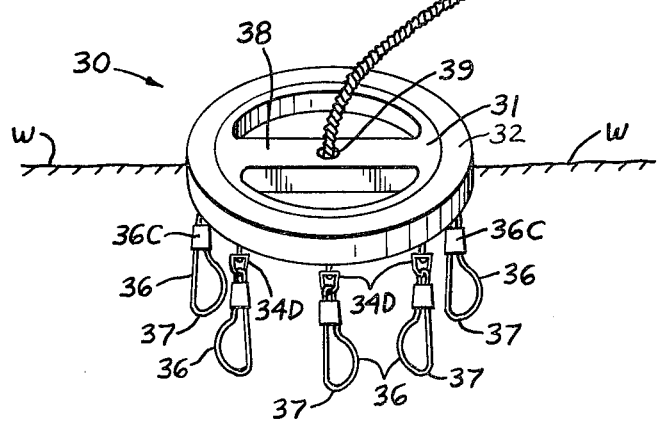
FIG-7

FISH RINGER

This invention relates generally to fishing accessories.

A principal object of the present invention is to provide a fish stringer or fish ringer, for use by a fisherman, in order to keep fish alive in a water.

Another object of the present invention is to provide a fish ringer, from which a plurality of snap hooks are supported, in order to hold a number of fish, and the snap hooks being positioned so as not to tangle.

A further object is to provide a fish ringer, in which the snap hooks are foldable under a center of the ring, so as to be placed in a cylindrical box, in order to eliminate the problem of separating the device from other tackle, in a tackle box.

Other objects are to provide a fish ringer, which is simple in design, inexpensive to manufacture, rugged in construction, easy to use and efficient in operation.

These, and other objects, will be readily evident upon a study of the following specification, and the accompanying drawings, wherein:

FIG. 1 is a top view of the invention; and

FIG. 2 is a cross sectional view thereof, taken on line 2—2 of FIG. 1.

FIG. 3 is a plan view of a further embodiment of the fish ringer modified and improved to float.

FIG. 3A is a section taken along line A—A in FIG. 3 to show "S" construction for strength.

FIG. 4 is a partially sectioned cross sectional elevational view taken along the line IV—IV of FIG. 3.

FIG. 5 is a cross sectional view taken along the line V—V in FIG. 4.

FIG. 6 is a bottom plan view of the fish ringer of FIG. 3 showing loop ends of the snap hooks in alignment with a central opening passing axially of the ring through the diametrical and transversely extending handle with a rope passed or pulled through the loop ends of the hooks held in flat position as secured for compact carrying thereof.

FIG. 7 is a perspective view of the fish ringer illustrating provision of a fastening clip at one end of the rope relative to a post having a loop-end bolt fastened thereto.

Referring now to the drawing in greater detail, the reference numeral 10 represents a fish ringer, according to the present invention wherein there is a circular ring 11, that is made preferably at a rigid, molded plastic material, and which includes a radially outwardly extending flange 12 having a plurality of eight equally spaced-apart openings 13 extending therethrough, and in each of which there is fitted a pin 14. The pin includes an enlarged head 15, which rests against the upper side of the flange 12, and a shank of the pin includes a transverse opening 16 therethrough, and through which there is fitted a snap hook 17. The pin is free to swivel within the opening 13, and additionally the snap hook is free to swivel within the pin opening 16.

A diametrically extending bar 18 extends across the center of the ring, the bar being channel-shaped, as clearly shown in FIG. 2. A central opening 19 extends through the bar, into which one end of a rope 20 is receivable, for attachment to the ring. A knot 21 is made on the end of the rope, and the knot is then enclosed within the channel 22 of the bar, as shown in FIG. 2. The device can thus be conveniently carried, and the rope may be used for securement of the fish ringer.

There are two advantages for the pin to freely rotate in the ring openings 13—it will eliminate the problem of fish tangling on the ring, and also it will make the fish ring compact for storing, and for carrying during the time of fishing, before the fish are placed upon the hooks. In order to make it more compact, the swivel hooks may be pivoted or swung inward under the ring, toward the center, in order that the snap hooks rest flat thereagainst. The link arrangement of the snap hooks is such, that they are longer than the radius of the ring 11, thus allowing the rope to pass through each of the snap hooks. The free end of the rope can then be passed through all of the hooks, securing them in the flat position.

The illustrations of FIGS. 3, 4 and 5 show a floating fish ringer embodiment represented generally by reference numeral 30 wherein there is a circular ring upper portion 31 that is made preferably of a rigid, molded plastic material. The ring 31 along the outer margin or periphery thereof has a substantially S-shaped configuration 31S which includes a downward flange portion 31D as well as a lower, radially outwardly extending flange portion 31L which terminates radially against a substantially L-shaped cross sectional or body portion 32. The substantially L-shaped cross sectional or body portion 32 includes a radially upper segment 32U and a substantially axially extending downward portion 32D with a radial undercut or groove 32G along inner periphery thereof. The S-shaped peripheral portion 31S of the ring 31 together with the L-shaped portion 32 define a space or chamber C therebetween which is filled with a floating foam material F filling the annular hollow cavity of the space or chamber C so that the fish ringer 30 is capable of floating on top of the water W. The lower radially outwardly extending flange portion 31L of the ring 31 includes integrally molded and downwardly extending projections or loops 33 defining an opening transversely therethrough that receives an eyelet 34 of a swivel fastener 34S secured to a closed loop having a D-shaped configuration 34D. The closed loop 34D has one end 35 of a snap hook 36 fastened movably thereto and a free loop end 37 of the snap hook 36 projects downwardly into the water from the floating ring configuration as illustrated in FIG. 4. The outer periphery of the lower portion 31L of the S-shaped peripheral configuration of the ring 31 snap fits into the groove 32G of the L-shaped member 32. The S-shaped configuration assures strength and rigidity in the construction of the ring 31 and the L-shaped member 32 has sufficient flexing capability to permit snap fitting of ring 31 into the groove 32G.

The foam F is located not only peripherally in the cavity C but also is fitted into a hollow underside of a diametrically extending bar or handle 38 having a substantially U-shaped inverted hollow configuration including recesses 38R under the handle for weight reduction. Optionally, the handle can be left free and open without any foam therein or foam can be added for increasing the floating capability brought about by the foam F. The ring 31 alone when made of polypropylene will float without hooks being attached; however, if the hooks are attached, the foam of cork, styrofoam (registered trademark) and the like is always added to make the fish ring float.

FIG. 5 shows an enlarged cross sectional view of the foam F sandwiched between the radially extending upper portion 32U of the L-shaped member 32 and the lower portion 31L of the ring 31. The U-shaped loop 33 engaged by the eyelet 34 of the fastener can also be seen more clearly in the enlarged sectional view of FIG. 5.

The floating embodiment of the fish ringer 30 as best seen in FIG. 4 has an advantage that sinking of the fish ringer is avoided so that loss thereof in water by dropping from a boat, fishing pier or overboard in any manner will not result in disappearance of the fish ringer even in muddy waters since the floating fish ringer will remain suspended on the surface of the water W where it can be readily recovered. There is noted also that bright plastic material used for the ring 31 and L-shaped portion 32 snap-fitted into engagement therewith will also enhance supporting and locating of the floating fish ringer to facilitate fastening of fish which have been caught to the individual loop ends 37 of the snap hooks 36. The snap hooks 36 include latching ends 36L which fit a loop clip 36C securely fastened to the snap hook 36 adjacent to the loop end 35 and in a location closer to the loop end 35 than to the free loop end 37 of the snap hook 36.

FIG. 6 illustrates in a bottom view the positioning of the snap hooks 36 so that the free loop ends 37 are axially aligned with a central opening 39 of the transverse or diametrical handle 38. A rope 40 is passed or pulled through the opening 39 and includes an enlarged end or grommet portion 42 secured therewith visible in FIGS. 4 and 6. This grommet end 42 can be tied in a loop relative to the remaining opposite end 40E of the rope 40. An annular ring 40R is provided adjoining the end 40E and is adapted to be engaged by a snap fastener 44 including a laterally shiftable end 44E. The snap fastener 44 is secured by an eyelet member 45 to a closed loop having a D-shaped configuration 44D. The snap fastener 44 is adapted to pass through a loop or eyelet portion 46 of a bolt or fastener 48 secured to a post, pylon, or portion P of a boat and the like. In this manner, the fish ringer 30 can be secured to float in water on one side of a pier or dock or outside a boat adjoining location where fish are being caught. The rope 40 of brightly colored plastic material can also be readily grasped to pull the floating fish ringer from the water temporarily to add a fish which has been caught to an additional still free snapping hook 36. The loops 33 are integral with the S-shaped peripheral outer portion of the main body portion of the fish ringer 31 and the swivel movement of the D-shaped members 34D is such that the free loop ends 37 can be permitted to dangle downwardly in the water as apparent from FIG. 4, or can be grouped collectively as illustrated in FIG. 6 with the rope 40 passing therethrough to hold the snapping hooks 36 in a neatly aligned arrangement which precludes the tangling and fouling of the snapping hooks 36 relative to each other.

There is to be understood that in place of securing the rope 40 with the fastener 46-48, it is also possible to loop the end of the rope with the snap hook 44 engaging the ring 40R either around the post P itself or round the wrist of an individual who is using the fish ringer.

Another advantage of the fish ringer of the present invention is that when trolling therewith, the fish ringer moves straight out and the fish attached thereto are pulled along with their bodies waving freely in the water and the fish which have been caught stay alive longer, whereas the other fish ringers such is not the case.

The fish ringer of the present invention provides a built-in handle which is smooth and easy to manipulate with the human hand. Moreover, the smooth handle of the fish ringer won't cut the hand as would be the case with rope or chain stringers, regardless of how much weight is on the fish ringer, which is easy to carry and easy to handle without any need to untangle fish when the fish are on the fish ringer. The fish hang freely in or out of the water, keeping the fish alive for a longer period of time. For storage the fish ringer hooks fold under and are secured with the cord in a central location resulting in a neat and compact unit ready for use during a future fishing trip. The fish ringer can be used anywhere and can be secured to a boat, a tree, a post or practically anything to which a rope can be tied.

There are eight swivel hooks of a triple safety lock type on the fish ringer and these hooks fold under for convenient storage. The hooks are made of Corrostan steel, a material with corrosion resistance both in salt water and in fresh water, very much like stainless steel. The hooks themselves are commercially available with a safety lock construction. The heat-treated hooks have a three-way lock system including one safety lock designed to lock into a clamp case so it will not pop or snap out, and a further slide safety lock that slides down over the initial safety lock for added protection, while the closure on the hook has a drag safety lock for final assurance. The fish ringer of the present invention has been designed to eliminate problems that fishermen have had with other fish stringers in the past. The revolutionary new design of the fish ringer makes it easy to handle. When carrying a heavy catch, the bar handle in the ring is easy on the hand and with the use of swivel hooks the problem of tangling is eliminated. The fish ringer is compact with eight swivel hooks, for example, that fold under for compact storage.

A six foot polypropylene cord has an "O" ring and swivel snap on the end which means that the cord can be secured to whatever is available. The cord can be snapped to a belt loop or a boat, or the cord can be wrapped around a tree or a post.

The construction of the fish ringer is strong and durable. The polypropylene ring is resistant to oils, gas, abrasion and rotting. The 85 lb. test swivel hooks have triple safety locks that resist salt and fresh water corrosion. The six foot long hollowed braided ¼" polypropylene cord resists oils, gas, abrasion and rotting. The swivel hooks eliminate tangling, and when trolling, the fish are separated and remain alive for a longer period of time. The fish ringer can be conveniently carried by the center bar of the ring and the floating embodiment of the fish ringer has the advantage that sinking of the fish ringer is avoided to preclude loss thereof in water which may be muddy or murky when dropping the fish ringer into the water from a boat, fishing pier or overboard in any manner without any disappearance of the fish ringer itself that remains suspended on the surface of the water where it can be readily recovered.

In summary, the present invention provides a fishing tackle accessory, for use by a fisherman, in order to keep fish alive in the water; the device includes a plastic circular ring around its periphery having spaced-apart pins, each with a snap hook swiveled thereto to hold the fish attached to the snap hooks. The ring includes a diametrically extending bar or handle, having a central opening, to which a rope is attachable, so that the device can be conveniently carried or secured. The snap hooks are capable of being moved at the free loop ends thereof into substantial alignment with the central opening such that the rope can pass through the loop ends of the snap hooks collectively holding the snap hooks together and in compact flat positioning when carrying the fish ringer. By passing or pulling the rope through the loop ends of the snap hooks, the possible interlocking and tangling of the hooks themselves with respect to each other is obviated. Also a snap clip on one end of the rope permits securing thereof to the wrist of an individual using the same or securing thereof to a post, eyelet or loop end of a bolt fastening member of a landing dock, fishing pier or boat. A downwardly extending recess is provided under a diametrically extending bar or handle for weight reduction; the plastic circular ring also is complemented by an L-shaped ring which snap-fits into a groove or undercut of the circular ring to form an annular space or chamber filled with a buoyant foam material exemplified by cork, plastic such as Styrofoam (registered trademark) and the like confined therein for making a floating version of the fish ringer.

While various changes may be made in the detail construction, it is understood that such changes will be within the spirit and scope of the present invention, as is defined by the appended claims.

What I claim is:

1. A fish stringer, comprising, in combination, a circular ring made of molded rigid plastic and including a radially outwardly extending flange integral therewith, means defining a plurality of openings through the rigid plastic of said flange having a snap hook secured thereto at each opening, a bar U-shaped in cross-section extending diametrically and integrally with said ring of rigid plastic a further ring element fitted complementary to said flange in a chamber defining relation thereto and a rope movably connected centrally of said bar.

2. A fish stringer, comprising, in combination, a circular ring made of molded rigid plastic and including a radially outwardly extending flange integral therewith, means defining a plurality of openings through the rigid plastic of said flange having a snap hook secured thereto at each opening, a bar extending diametrically and integrally with said ring of rigid plastic, and a rope movably connected centrally of said bar, and an L-shaped ring element being fitted to said ring to form an annular chamber with said flange.

3. The combination of claim 2, in which said bar is a transverse handle having a U-shaped cross section for reduction of weight.

4. The combination of claim 2, in which said rope has an eyelet at one end and a swivel snap hook member at an opposite end for fastening purposes.

5. The combination of claim 4, in which said snap hook member is secured to the eyelet to form a loop for fastening purposes.

6. The combination of claim 2, in which a filling is inserted in the annular chamber to aid in floating upon fishing waters.

7. The combination of claim 6, in which said filling is cork.

8. The combination of claim 2, in which said ring has a substantially S-shaped cross section.

9. A fish stringer, comprising, in combination, a circular ring made of molded rigid plastic and including a radially outwardly extending flange integral therewith, means defining a plurality of openings through the rigid plastic of said flange having a snap hook secured thereto at each opening, a bar extending diametrically and integrally with said ring of rigid plastic, and a rope movably connected centrally of said bar, said bar being a transverse handle having a U-shaped cross section, an L-shaped ring element fitted to said ring to form an annular chamber with said flange, and a foam filling inserted in both the annular chamber and said U-shaped cross section for buoyancy to float upon fishing waters even when caught fish are secured to one or more snap hooks.

10. The combination of claim 9, in which said L-shaped ring element has a groove along inner periphery to snap fit complementary to outer periphery of said flange.

11. The combination of claim 10, in which said rope has a snap hook member at one end and an eyelet spaced therefrom on the rope movably connected substantially centrally of said bar, said rope being joined in a closed loop by attachment of said snap hook member to said eyelet.

12. The combination of claim 11, in which at least two snap hooks secured to the flange at each opening are moved radially inwardly and aligned centrally of said bar with said rope passing through the snap hooks to hold the same radially inwardly for transporting purposes.

13. The combination of claim 12, in which said foam filling is plastic Styrofoam.

14. The combination of claim 12, in which the means defining the openings are semi-circular radially extending portions integral with said flange of rigid plastic.

15. The combination of claim 14, in which said rope is brightly colored plastic and when trolling therewith the fish ringer moves straight out and fish attached thereto are pulled along.

16. The combination of claim 14, in which said ring and flange therewith are made of integrally molded plastic.

17. The combination of claim 16, in which said molded plastic is brightly colored polypropylene.

* * * * *